Jan. 2, 1951     E. P. BULLARD, III     2,536,624
MECHANICAL MOVEMENT
Original Filed June 24, 1944
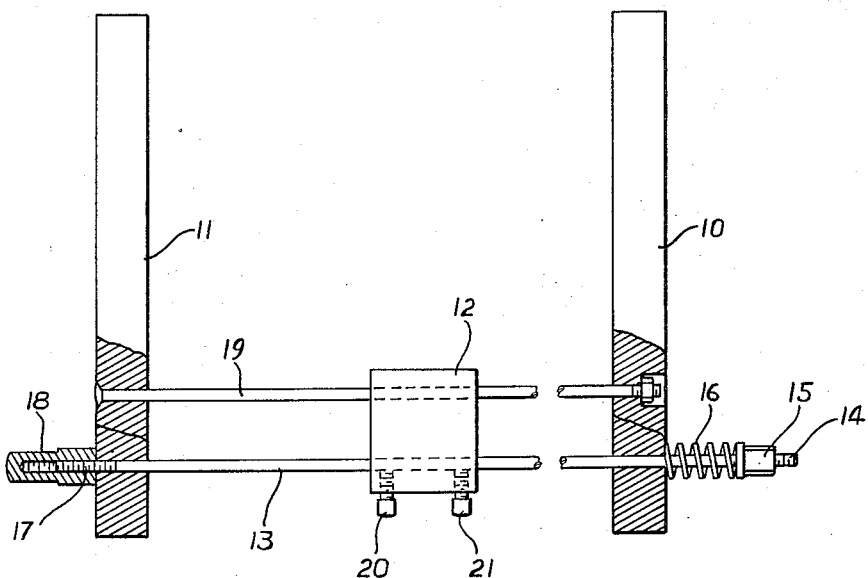
INVENTOR.
EDWARD P. BULLARD III
BY
*Paul M. Gist*
ATTORNEY Patented Jan. 2, 1951

2,536,624

UNITED STATES PATENT OFFICE 2,536,624

MECHANICAL MOVEMENT

Edward P. Bullard, III, Fairfield, Conn., assignor to The Bullard Company, a corporation of Connecticut Original application April 5, 1945, Serial No. 586,799, which is a division of application Serial No. 541,986, dated June 24, 1944. Divided and this application February 27, 1948, Serial No. 11,550

4 Claims. (Cl. 74—526)

This invention relates to the art of mechanical movements and particularly to apparatus for accurately moving a member in space to an exact location. This is a division of application Serial Number 586,799, filed April 5, 1945, now Patent No. 2,511,821, which itself is a division of application Serial Number 541,986, filed June 24, 1944, now Patent No. 2,528,736, all in the name of Edward P. Bullard, III.

The principal object of this invention is to provide apparatus for accurately locating a member in space; and the provision of apparatus for accurately adjusting a supporting member over a limited range of movement on which is mounted an element that can be moved with facility along said member to a point within said limited range.

The above, as well as other objects and novel features of the invention will become apparent from the following specification and accompanying drawing, in which:

The single figure discloses apparatus to which the principles of the invention have been applied.

Referring to the drawing, the principles of the invention have been shown as applied to a switch-tripping dog and mounting therefor. Frame members 10 and 11 are mounted in fixed spaced relation on a support (not shown). They may be spaced a distance equal, or proportional to the length of the path of travel of a member, the movement of which is to be controlled. A dog 12 is employed to actuate an electrical switch (not shown), and is mounted for free sliding movement on a wire 13 that is stretched between the members 10 and 11. The wire 13 is mounted for limited axial movement relatively to the members 10 and 11. It includes a threaded end 14 on which a nut 15 is mounted. A spring 16 is compressed between the member 10 and the nut 15 thereby resiliently urging the wire 13 rightwardly as shown in the drawing. The opposite end of wire 13 is provided with a micrometer thread 17 on which is threaded a nut 18. The nut may be provided with equally spaced divisions about its periphery that cooperate with an index scratch on the member 11.

A secondary wire 19 is stretched between members 10 and 11, and passes through the dog 12 in parallel relation with wire 13. This construction provides rigidity to the mounting of dog 12 and maintains it in its correct angular position relatively to wire 13. Set screws 20, 21 are provided in the dog 12 for rigidly securing it to the wire 13.

The above-described apparatus makes it possible to very accurately locate a member in space with ease and facility. The principles of the invention are particularly applicable where a large number of such dogs 12 are located within a relatively small space, such as, for example, as is shown in the parent application above-referred to. Furthermore, slight inaccuracies in the setting of dog 12 can easily be overcome by simply turning the micrometer head in the correct direction. The spring 16 functions at all times to insure proper movement of the supporting wire 13 as dictated by the operation of nut 18.

Although the principles of the new apparatus have been shown and described in detail to fully disclose one embodiment of the invention, it will be evident that certain features may be used without others, without departing from the principles of the invention.

What is claimed is:

1. Apparatus comprising in combination, a supporting rod; a frame for holding said supporting rod; a member slidably mounted on said supporting rod and adapted to be releasably fixed to said supporting rod at any point therealong within the confines of said frame; a micrometer head threaded to one end of said rod and adapted to abut against said frame; and resilient means normally urging said micrometer head against said frame.

2. Apparatus comprising in combination, a frame; a fixed guide rod mounted in said frame; a member slidably mounted on said guide rod; another rod mounted in said frame, extending through said member; means for releasably fixing said member to said other rod; a micrometer head threaded to one end of said other rod and adapted to abut against said frame; and resilient means normally urging said micrometer head against said frame.

3. In an electrical switch-tripping device, a frame; a wire supported by said frame; an axially-extending micrometer nut threaded to one end of said wire and abutting one side of said frame; a pre-loaded compression spring surrounding said wire at its other end and abutting another side of said frame; and a tripping element slidably mounted on said wire and adapted to be fixed thereto at different locations therealong.

4. In an electrical switch-tripping device, a frame; a wire supported by said frame; an axially-extending micrometer nut threaded to one end of said wire and abutting one side of said frame; a pre-loaded compression spring surrounding said wire at its other end and abutting another side of said frame; a second wire supported by said frame in parallel relation to said first wire; and a tripping element slidably mounted on said wires and adatped to be fixed to said first-mentioned wire at different location therealong.

EDWARD P. BULLARD, III.

REFERENCES CITED

The following references are of record in the file of this patent:

UNITED STATES PATENTS

| Number | Name | Date |
|---|---|---|
| 305,515 | Fay | Sept. 23, 1884 |
| 945,472 | Moores | Jan. 4, 1910 |
| 1,273,235 | Lamphere | July 23, 1918 |
| 1,637,921 | Simpson | Aug. 2, 1927 |
| 1,717,326 | Shaw | June 11, 1929 |